United States Patent
Nakajima et al.

(10) Patent No.: US 8,669,730 B2
(45) Date of Patent: Mar. 11, 2014

(54) VENTILATION DEVICE

(75) Inventors: Tsuraki Nakajima, Aichi (JP); Tooru Ichikawa, Aichi (JP)

(73) Assignee: Panasonic Corporation, Osaka (JP)

( * ) Notice: Subject to any disclaimer, the term of this patent is extended or adjusted under 35 U.S.C. 154(b) by 36 days.

(21) Appl. No.: 13/522,763

(22) PCT Filed: Aug. 5, 2010

(86) PCT No.: PCT/JP2010/004931
§ 371 (c)(1),
(2), (4) Date: Jul. 18, 2012

(87) PCT Pub. No.: WO2011/092756
PCT Pub. Date: Aug. 4, 2011

(65) Prior Publication Data
US 2012/0286715 A1 Nov. 15, 2012

(30) Foreign Application Priority Data

Feb. 1, 2010 (JP) ................................. 2010-020070

(51) Int. Cl.
*H02P 7/28* (2006.01)
*F24F 7/00* (2006.01)

(52) U.S. Cl.
USPC .................. 318/450; 318/400.1; 318/400.17; 318/400.27; 318/400.38

(58) Field of Classification Search
USPC ........ 318/400.1, 400.17, 400.21, 400.38, 450
See application file for complete search history.

(56) References Cited

U.S. PATENT DOCUMENTS

| | | | |
|---|---|---|---|
| 5,783,757 A * | 7/1998 | Le Van Suu | 73/204.27 |
| 2008/0303464 A1 * | 12/2008 | Takada | 318/400.17 |
| 2011/0257791 A1 * | 10/2011 | Hawker et al. | 700/275 |
| 2011/0279070 A1 * | 11/2011 | Tanaka et al. | 318/400.1 |

FOREIGN PATENT DOCUMENTS

| | | |
|---|---|---|
| JP | 2004-340490 | 12/2004 |
| JP | 2007-032998 | 2/2007 |
| JP | 2008-139224 | 6/2008 |
| JP | 2010-022102 | 1/2010 |

OTHER PUBLICATIONS

International Search Report of PCT Application No. PCT/JP2010/004931 dated Nov. 9, 2010.

* cited by examiner

*Primary Examiner* — Paul Ip
(74) *Attorney, Agent, or Firm* — Panasonic Patent Center

(57) ABSTRACT

A ventilating system that can make an air flow rate variable includes a DC motor that drives blades and a control circuit that controls the DC motor. The control circuit includes a first current detecting unit that detects a current flowing in the DC motor, a rotating speed detecting unit that detects a rotating speed of the DC motor, and a control unit that controls the DC motor based on a rotating speed detected by the rotating speed detecting unit and a current detected by the first current detecting unit. The current detecting unit includes a plurality of low-resistance resistors, detects a motor current by using divided voltages of the low-resistance resistors, and calculates a ventilation air flow rate based on the rotating speed detected by the rotating speed detecting unit and the current detected by the first current detecting unit.

17 Claims, 14 Drawing Sheets

VENTILATION DEVICE

TECHNICAL FIELD

The present invention relates to a ventilating system that always ventilates a room to obtain a predetermined air flow rate regardless of influences of a length of a duct and an external wind pressure.

BACKGROUND ART

A conventional ventilating system of this type includes box-like ventilating fan body 103, motor 101 arranged in ventilating fan body 103, and blades 102 driven by motor 101. Ventilating fan body 103 is arranged on ceiling portion 104. The ventilating system of this type includes rotating speed detecting unit 105 that detects a rotating speed of motor 101 and current detecting unit 106 that detects a current flowing in the motor. Such a ventilating system controls motor 101 based on a rotating speed detected by rotating speed detecting unit 105 and a current detected by current detecting unit 106. Furthermore, a total ventilation air flow rate in ventilation performed in a period of a predetermined cycle is calculated based on the rotating speed detected by rotating speed detecting unit 105 and the current detected by current detecting unit 106. The calculated total ventilation air flow rate and a target total ventilation air flow rate of a predetermined cycle are compared with each other to calculate an excess or deficiency, and a ventilation air flow rate of a next cycle period is controlled such that a total ventilation air flow rate of the next cycle period is a value obtained by adding the excess or deficiency to the target ventilation air flow rate. This control is performed every cycle.

In the conventional ventilating system, as a drive motor that drives blades, a DC motor is frequently used, and an air flow rate is frequently set in a multi stage (for example, super high, high, and low). When the air flow rate of the ventilating system is set in a multi stage, for example, the air flow rate is consequently controlled in a very wide range, for example, air flow rate regions of 100 m$^3$/h to 400 m$^3$/h. In order to control an air flow rate in a very wide range and to control an air flow rate to set the air flow rate constant by using a current flowing in the motor and a rotating speed, the current needs to be detected more accurately.

PRIOR ART DOCUMENT

Patent Document

Patent Document 1: Unexamined Japanese Patent Publication No. 2004-340490

DISCLOSURE OF THE INVENTION

The present invention provides a ventilating system that can set an air flow rate constant even though the ventilating system has a very wide range of an air flow rate because a current flowing in a motor can be accurately detected.

The ventilating system according to the present invention is a ventilating system that can change an air flow rate, and includes a DC motor that drives blades and a control circuit that controls the DC motor. The control circuit includes a first current detecting unit that detects a current flowing in the DC motor, a rotating speed detecting unit that detects a rotating speed of the DC motor, and a control unit that controls the DC motor based on the rotating speed detected by the rotating speed detecting unit and the current detected by the first current detecting unit. The first current detecting unit includes a plurality of low-resistance resistors, detects a motor current by using divided voltages of the low-resistance resistors, and calculates a ventilation air flow rate based on a rotating speed detected by the rotating speed detecting unit and a current detected by the first current detecting unit.

PREFERRED EMBODIMENTS FOR CARRYING OUT OF THE INVENTION

Embodiments of the present invention will be described below with reference to FIGS. 1 to 17.

Embodiment 1

As an example of ventilating system according to the present invention, a ventilating system installed on a ceiling in a building will be described.

Figure 1:
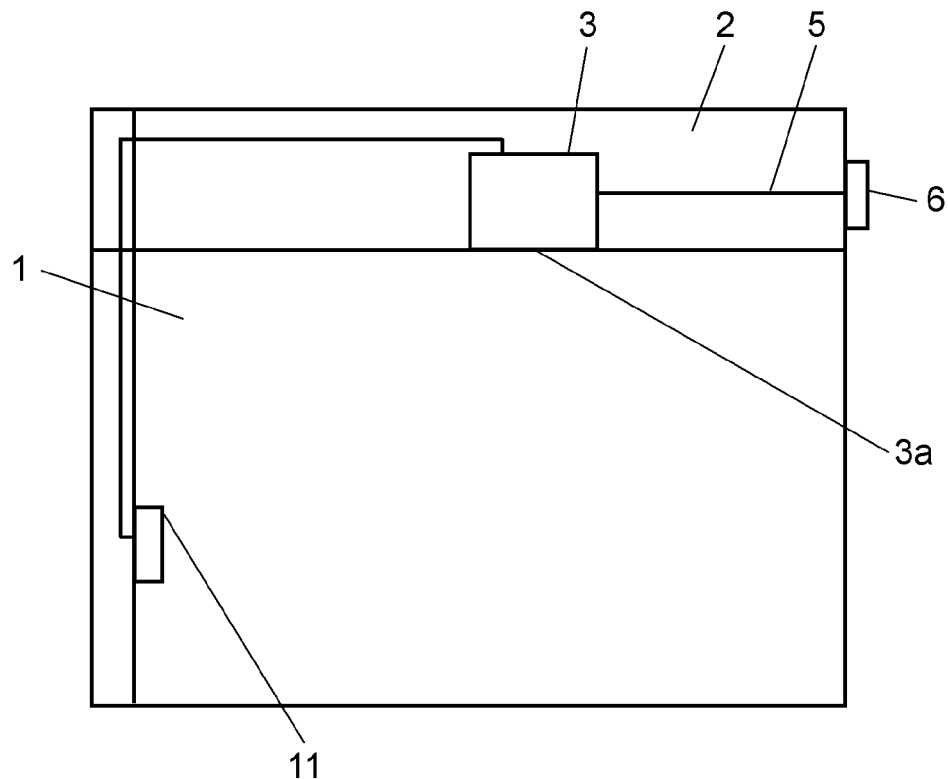
FIG. 1 is an attaching state diagram of a ventilating system according to Embodiment 1 of the present invention.
Figure 2:
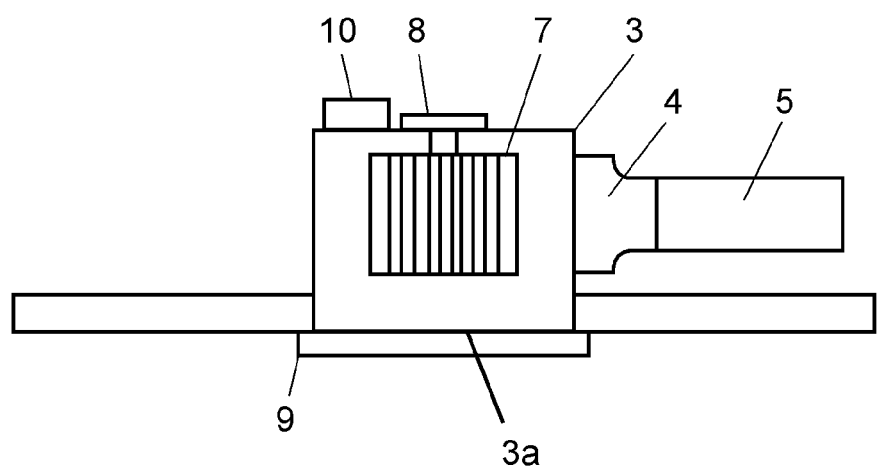
FIG. 2 is an attaching state diagram showing a state in which the ventilating system according to Embodiment 1 of the present invention is attached to a ceiling.

As shown in FIGS. 1 and 2, main body 3 of the ventilating system is installed in attic 2 in, for example, room 1. Suction opening 3a is formed under main body 3. Adapter 4 is arranged on a side surface of main body 3, and one end of exhaust air duct 5 is connected to adapter 4. The other end of exhaust air duct 5 is connected to exhaust port 6 formed in a wall surface in the room. With the above configuration, air sucked from suction port 3a is discharged from exhaust port 6 to the outside through exhaust air duct 5.

In main body 3, blades 7 and DC motor 8 that rotates blades 7 are arranged. Suction port 3a includes louver 9 having a ventilation hole that covers suction port 3a.

Control circuit 10 that drives DC motor 8 is arranged on a ceiling surface side of main body 3 of the ventilating system. Switch 11 (integrally configured switch) is arranged on a wall in a room and connected to main body 3 of the ventilating system. Switch 11 is to be performed when a user turns on/off a commercial power supply or changes over a fan notch.

Figure 3:
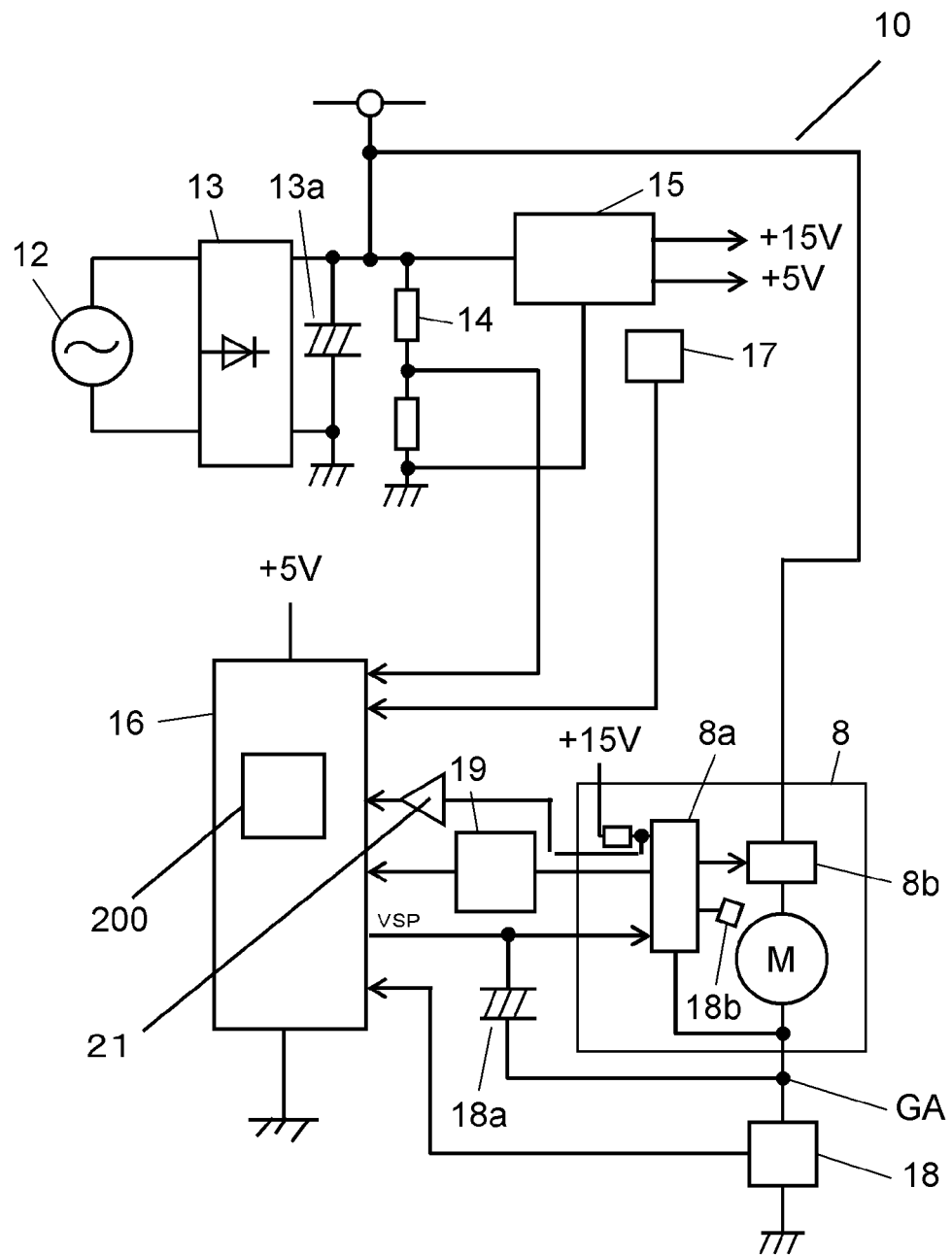
FIG. 3 is a block diagram showing a configuration of a control circuit of the ventilating system according to Embodiment 1 of the present invention.

FIG. 3 is a block diagram showing a configuration of control circuit 10 of main body 3 of the ventilating system. In FIG. 3, rectifying circuit 13 is connected to commercial power supply 12. Smoothing capacitor 13a that smoothes a voltage to obtain a DC voltage is connected to rectifying circuit 13. Voltage detecting unit 14 that detects a DC voltage and DC motor 8 are connected to smoothing capacitor 13a in parallel with each other. Switching power supply circuit 15 (for example, an AC-DC converter) is further connected to smoothing capacitor 13a.

A control circuit that controls DC motor 8 is built in DC motor 8. The control circuit includes control drive IC 8a for controlling a DC motor, hall element 18b serving as a position detecting sensor that detects a position of a rotor of DC motor 8, drive circuit 8b that energizes a stator winding of DC motor 8, and a three-phase winding (not shown) serving as the stator winding. The ground of control drive IC 8a and the ground of drive circuit 8b are commonly connected. A current flowing on a ground (GA) side of DC motor 8 is a total sum, i.e., a synthetic current between a current flowing in control drive IC 8a, i.e., a DC motor drive current and a current flowing in the three-phase winding through drive circuit 8b, i.e., a current flowing in the motor itself.

Switching power supply circuit 15 outputs a voltage (for example, +15 V) of control drive IC 8a and a voltage (for example, +5 V) that operates control unit 16 (for example, a microcomputer). Near switching power supply circuit 15, temperature detecting unit 17 that measures a temperature of switching power supply circuit 15 is arranged. The temperature measured by temperature detecting unit 17 is input to control unit 16. Current detecting unit 18 (first current detecting unit) that detects a current flowing in DC motor 8 is also arranged. Current detecting unit 18 detects a current flowing into the ground (GA) of DC motor 8 and inputs the current to control unit 16.

Control unit 16 outputs control signal VSP to DC motor 8 based on the current detected by current detecting unit 18. DC motor 8 makes an applied voltage variable depending on a voltage value (motor designation voltage) of control signal VSP.

Control signal VSP is configured to output a pulse from control unit 16, to smooth the output value through smoothing capacitor 18a, and to apply a smoothed DC voltage to DC motor 8. Smoothing capacitor 18a is connected to the ground (GA) of DC motor 8. Smoothing capacitor 18a is connected to smooth control signal VSP with reference to a potential of the ground (GA).

When a voltage of control signal VSP is applied to DC motor 8, drive circuit 8b is driven by control drive IC 8a, and a current flows in the three-phase winding. When the current flows in the three-phase winding, the rotor of DC motor 8 rotates. The rotation of the rotor is detected by, for example, hall element 18b. Hall element 18b outputs power to rotating speed detecting unit 19 depending on the rotation of DC motor 8. In this manner, rotating speed detecting unit 19 can detect a rotating speed of DC motor 8.

In control unit 16, a current-rotating speed relationship obtained when a static pressure is changed from P0 to Pmax in ventilation air flow rate is calculated in advance and stored as a data table (not shown).

Figure 4:
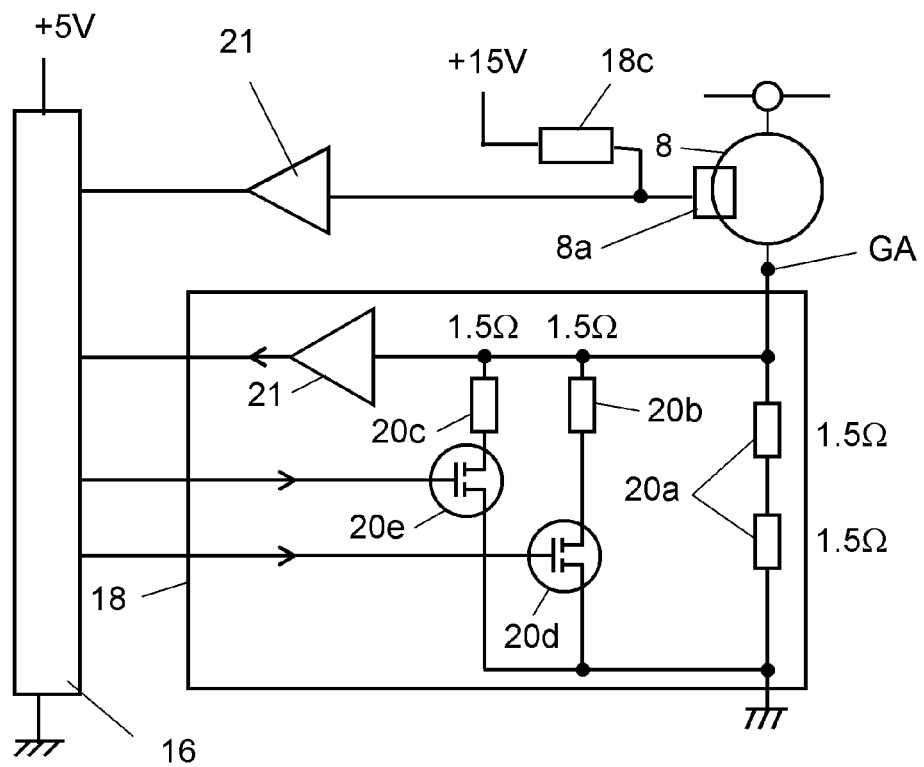
FIG. 4 is a block diagram of a current detecting unit of the ventilating system according to Embodiment 1 of the present invention.

FIG. 4 is a diagram showing a configuration of current detecting unit 18. In FIG. 4, current detecting unit 18 is configured by a low-resistance resistor having a resistance of 1.5Ω or less. For example, two low-resistance resistors 20a are connected in series with the ground (GA) of DC motor 8, and one side of each of low-resistance resistors 20a connected in series is connected to the ground of switching power supply circuit 15. First resistor 20b (low-resistance resistor) and second resistor 20c (low-resistance resistor) are arranged to be freely connected in parallel with low-resistance resistors 20a. First resistor 20b or second resistor 20c is configured to be freely connected to low-resistance resistors 20a by first switching unit 20d or second switching unit 20e, respectively. First switching unit 20d and second switching unit 20e serving as low-resistance resistor switching units are switched to make it possible to switch resistances of current detecting unit 18.

A potential of the ground (GA) of DC motor 8 is amplified by amplifier 21 (for example, operational amplifier).

Temperature detecting unit 17 is configured by, for example, a thermistor. The thermistor has a resistance that changes when the thermistor is heated.

As shown in FIG. 3, values detected by temperature detecting unit 17, current detecting unit 18, rotating speed detecting unit 19, and voltage detecting unit 14 are input to control unit 16 (microcomputer). A program which can perform a series of operations based on the input detected values of the detecting units is written in control unit 16.

More specifically, when current detecting unit 18 detects a current from DC motor 8, the current is detected while switching first switching unit 20d and second switching unit 20e as needed. As also described in the above configuration, a voltage value of control signal VSP given to DC motor 8 is connected with reference to the ground (GA) of DC motor 8. For this reason, if first switching unit 20d and second switching unit 20e are switched to connect first resistor 20b, a resistance of current detecting unit 18 changes from 3Ω to 1Ω. As a result, the ground level of DC motor 8 changes with respect to the ground level of control unit 16, and a voltage value of control signal VSP that is actually desired to be given changes. A program that corrects control signal VSP is also written in control unit 16.

Figure 5:
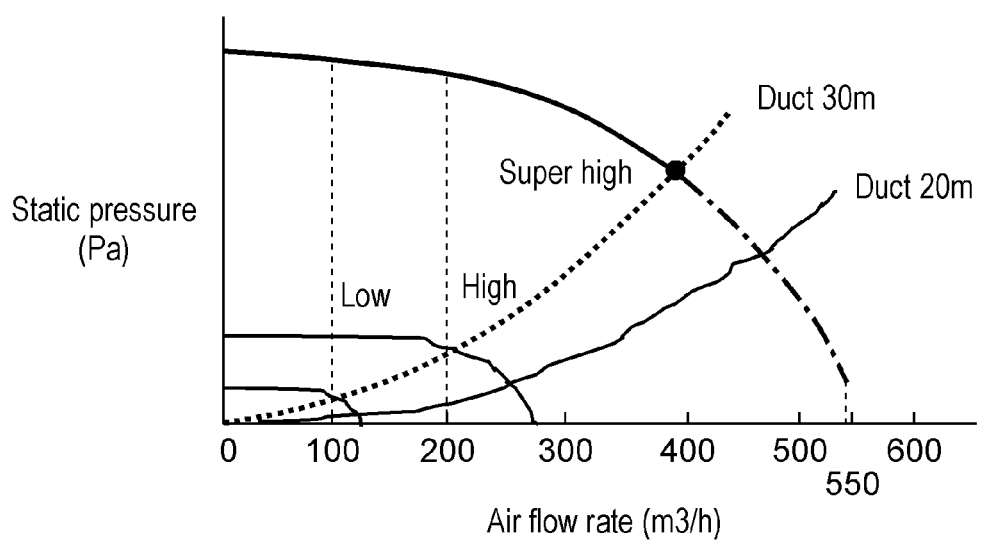
FIG. 5 is a static pressure (Pa)-ventilation air flow rate (Q) characteristic curve of the ventilating system according to Embodiment 1 of the present invention.

A concrete operation of the ventilating system according to the present embodiment having the above configuration will be described with reference to FIG. 5 and FIG. 6. FIG. 5 is a static pressure (Pa)-ventilation air flow rate ($m^3$/h) characteristic curve, and FIG. 6 is a flow chart showing a driving operation of the ventilating system according to the present embodiment.

Figure 6:
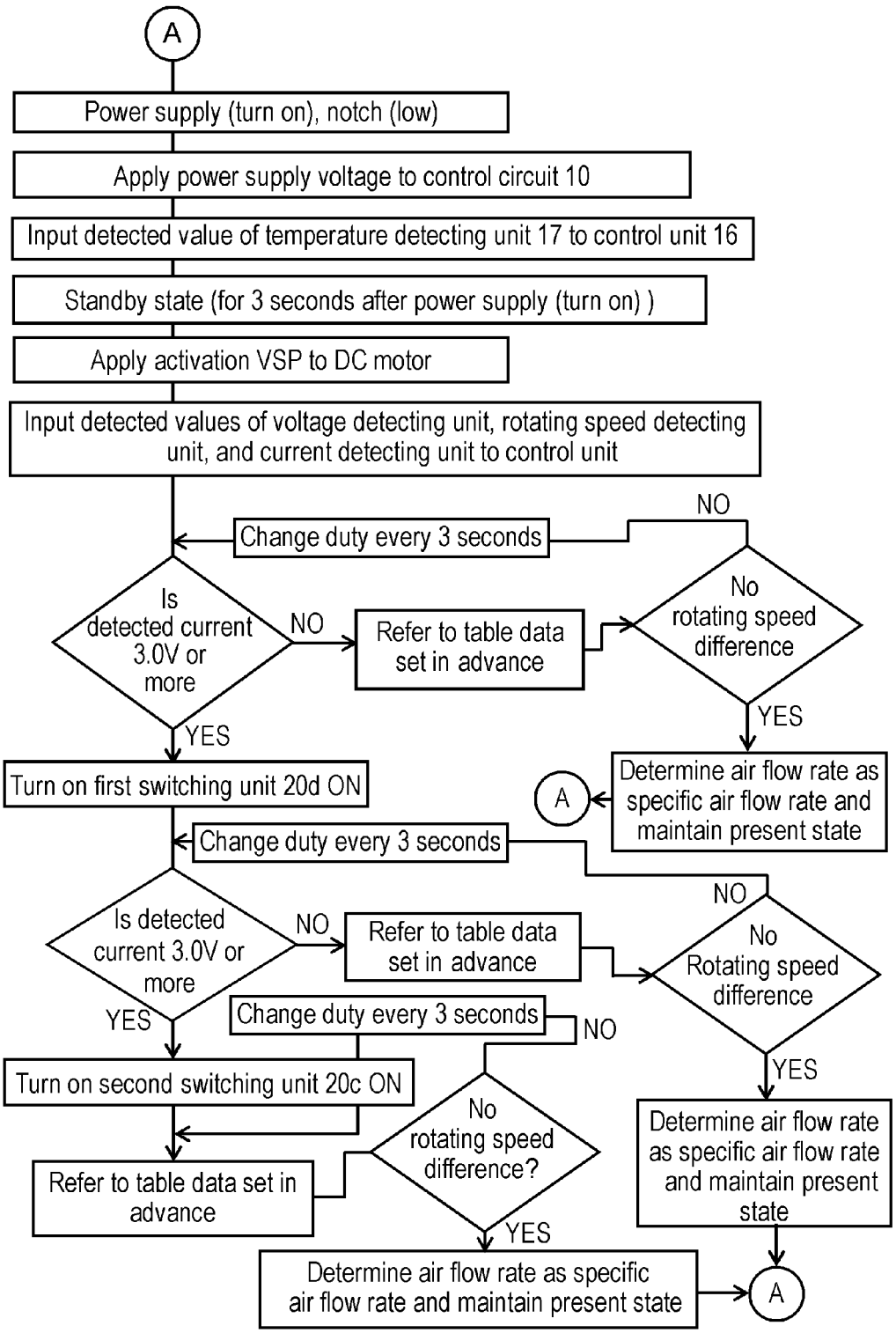
FIG. 6 is a flow chart showing a driving operation of the ventilating system according to Embodiment 1 of the present invention.

For example, as shown in FIG. 6, when a user of the ventilating system operates switch 11 to turn on commercial power supply 12 and to set a low notch as a fan notch, main body 3 of the ventilating system is powered on, and a power supply voltage is applied to control circuit 10. As shown in FIG. 5, when the low notch is set, 100 $m^3$/h is selected as an air flow rate.

As shown in FIG. 6, a temperature detected by temperature detecting unit 17 is input to control unit 16. When the fan notch is set, control unit 16 is set in a standby state for 3 seconds after the power supply voltage is applied to reliably operate DC motor 8. Thereafter, control signal VSP (to be referred to as an activation compensation VSP hereinafter) serving as an activation compensation value is applied to DC motor 8. As the activation compensation VSP, a value at which DC motor 8 can be operated at a low temperature or the like is preferably selected because DC motor 8 may not be activated due to the low temperature or the like.

The standby state mentioned here means a state in which control unit 16 leaves DC motor 8 unoperated without immediately driving DC motor 8.

After the power supply voltage is applied, the reason why DC motor 8 is maintained in the standby state for 3 seconds is as follows. The ventilating system according to the present embodiment is configured to be able to directly turn on/off commercial power supply 12 with switch 11. For this reason, when the user of the ventilating system continuously turn on/off/on the power supply of the ventilating system, DC motor 8 may rotate through inertia even in a power-off state. When the power supply is turned on in this state, a regenerative current may flow to break the elements because a voltage is generated with rotation of the motor. In order to avoid this, the standby state is set to wait until DC motor 8 is completely stopped.

When the activation compensation VSP is input to DC motor 8, a current flows in the three-phase winding of DC motor 8 to rotate DC motor 8. At this time, a current detected by current detecting unit 18, a rotating speed detected by rotating speed detecting unit 19, and a value of a voltage detected by voltage detecting unit 14 are input to control unit 16.

At this time, both first switching unit 20d and second switching unit 20e of current detecting unit 18 are open.

When the value detected by current detecting unit 18 does not reach, for example, 3.0 V, control unit 16 keeps first switching unit 20d and second switching unit 20e in the open state and compares the detected value of current detecting unit 18 input to control unit 16 with data table stored in control unit 16 in advance. As a result, when it is determined that the rotating speed of the rotor of DC motor 8 is higher than a specific rotating speed to obtain a specific ventilation air flow rate, control unit 16 boosts the duty cycle every 3 seconds. When this operation is repeated to eliminate a difference between the rotating speed and the specific rotating speed, control unit 16 determines that a ventilation air flow rate is specific to cancel the variable state of the duty cycle.

For example, a duct resistance increases due to the influence of external wind or the like, the rotating speed decreases to increase a current. As a result, when the value detected by current detecting unit 18 is 3.0 V or more, first switching unit 20d is turned on (ON). In this manner, first resistor 20b is connected to low-resistance resistors 20a in parallel with each other. More specifically, the resistance of current detecting unit 18 is 1Ω. When the value detected by current detecting unit 18 does not reach 3.0 V when first switching unit 20d is turned on, this state is maintained. As in the above description, the detected value of current detecting unit 18 input to control unit 16 and the data table stored in control unit 16 in advance are compared with each other. When the rotating speed of the rotor of DC motor 8 is higher or lower than the specific rotating speed, the duty cycle is changed every 3 seconds. When the difference between the rotating speed and the specific rotating speed is eliminated by repeating the above operation, control unit 16 determines that the specific ventilation air flow rate is obtained to cancel the variable state of the duty cycle.

On the other hand, when the value detected by current detecting unit 18 is 3.0 V or more when first switching unit 20d is turned on, second switching unit 20e is further turned on. In this manner, second resistor 20c is connected in parallel with low-resistance resistors 20a and first resistor 20b. That is, the resistance of current detecting unit 18 is 0.6Ω. As in the above description, the detected value of current detecting unit 18 input to control unit 16 is compared with the data table stored in control unit 16 in advance. When the rotating speed of the rotor of DC motor 8 is higher or lower than the specific rotating speed, the duty cycle is changed every 3 seconds. When the difference between the rotating speed and the specific rotating speed is eliminated by repeating the above operation, control unit 16 determines that the specific ventilation air flow rate is obtained to cancel the variable state of DUTY.

As described above, the ventilation air flow rate is adjusted by boosting or lowering the duty cycle every 3 seconds. Control unit 16 includes designation voltage varying unit 200 that corrects a voltage value of control signal VSP. As described above, when first switching unit 20d or second switching unit 20e is switched to connect first resistor 20b or second resistor 20c, designation voltage varying unit 200 corrects the voltage value of control signal VSP in accordance with a switching state to give the corrected value to DC motor 8.

A current flowing in the three-phase winding of DC motor 8 is calculated by subtracting a current flowing in control drive IC 8a from a current detected by current detecting unit 18 of DC motor 8. As shown in FIG. 4, the current flowing in control drive IC 8a is detected by current detecting unit 18c, and the detected value is input to control unit 16 through amplifier 21. Since a standby current of DC motor 8 linearly changes depending on an atmospheric temperature, the standby current is calculated such that a temperature correction coefficient is calculated from the temperature detected by temperature detecting unit 17 to perform temperature correction.

The ventilating system configured as described above, first switching unit 20d and second switching unit 20e are switched depending on the detected value of the current flowing in DC motor 8. In this manner, the resistance of current detecting unit 18 is switched to always select an optimum resistance with respect to a current flowing in the DC motor, and current detection is performed. For this reason, since a current flowing in the DC motor can be accurately detected, a ventilation air flow rate can be kept constant even though a duct resistance changes due to the influence of external wind or the like.

Although the change of the duty cycle described in the present embodiment is performed every three seconds, even though the cycle is made variable by being shortened or elongated, the same effect as described above can be obtained.

A threshold value of the switching between first switching unit 20d and second switching unit 20e is set to 3.0 V. However, even though the threshold value is changed, the same effect as described above is obtained.

First switching unit 20d and second switching unit 20e and the resistors corresponding thereto are constituted by two switching units and two resistors. However, even though the numbers of switching units and the number of resistors are changed and adjusted, the same effect as described above can be obtained.

Although a current detecting method of current detecting unit 18 is configured by a low-resistance resistor switching method, even a method including a gain changing unit (not shown) that switches gains of amplifier 21 is used, the same effect as described above can be obtained.

Embodiment 2

Figure 7:
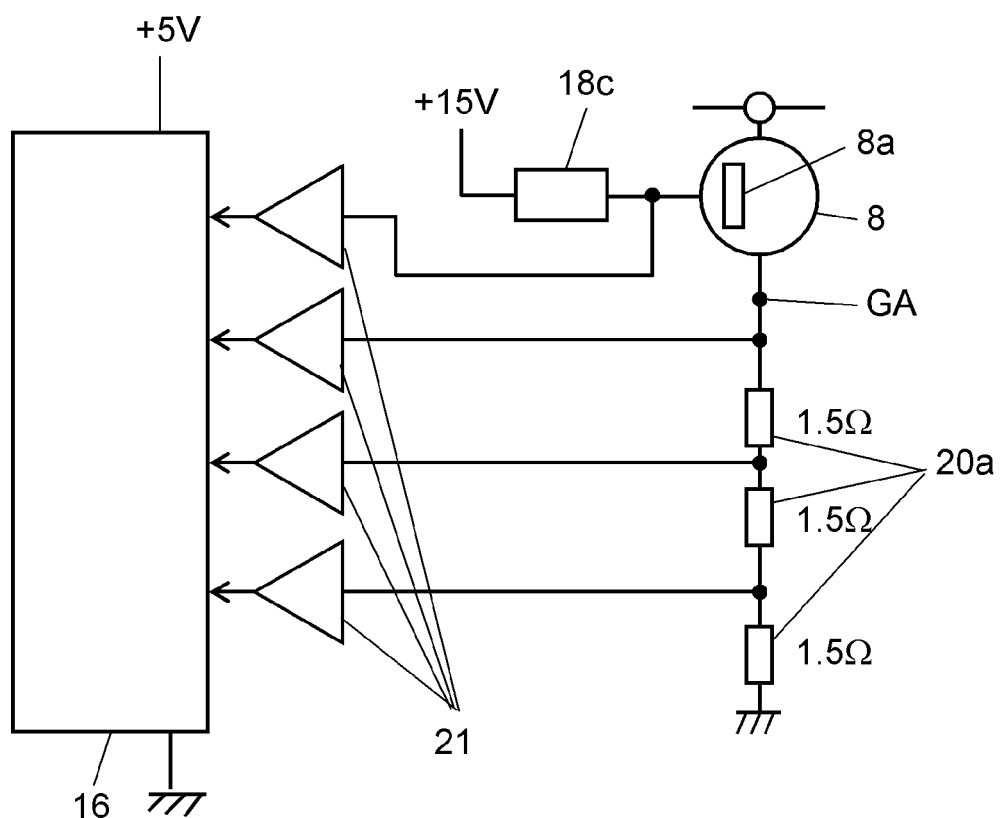
FIG. 7 is a block diagram of a current detecting unit in Embodiment 2 of the present invention.
Figure 8:
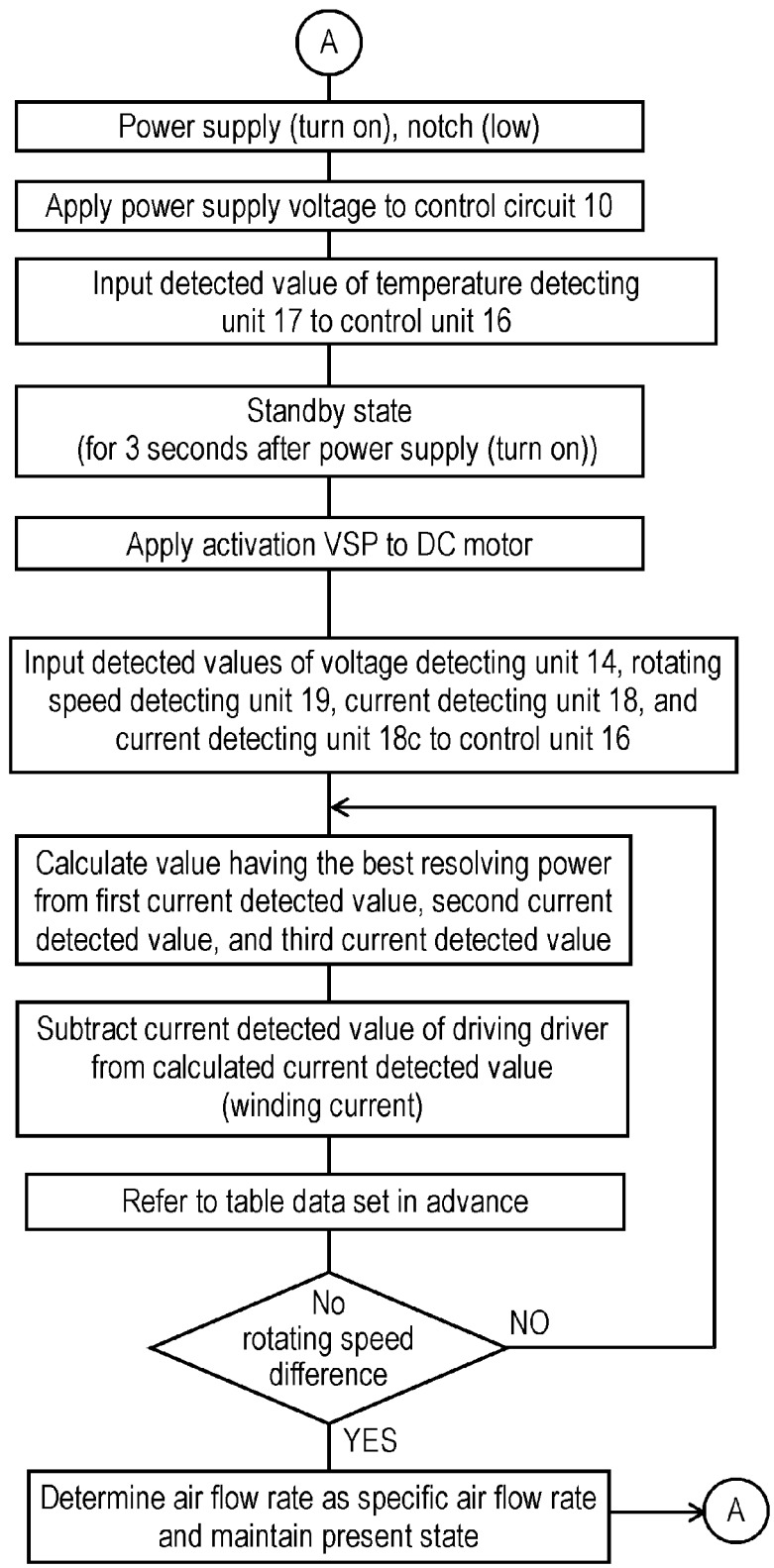
FIG. 8 is a flow chart showing a driving operation of the ventilating system according to Embodiment 2 of the present invention.

Embodiment 2 of the present invention will be described below with reference to FIGS. 7 and 8. A description of the same constituent elements as those in Embodiment 1 will be omitted. FIG. 7 is a block diagram of a current detecting unit in Embodiment 2 of the present invention. FIG. 8 is a flow chart showing a driving operation of the ventilating system according to Embodiment 2 of the present invention.

In current detecting unit 18 according to the present embodiment, in place of first switching unit 20*d* or second switching unit 20*e* according to Embodiment 1, as shown in FIG. 7, a plurality of low-resistance resistors are arranged in series between the ground (GA) of DC motor 8 and the ground of switching power supply circuit 15 to detect a current.

As in Embodiment 1, in order to detect a current flowing in control drive IC 8*a*, current detecting unit 18*c* (second current detecting unit) is arranged between a power supply line (+15 V) of switching power supply circuit 15 and control drive IC 8*a*.

In the above configuration, an operation of the ventilating system according to the present embodiment will be described below with reference to the flow chart shown in FIG. 8.

A description of the same operation as that in Embodiment 1 will be omitted. For example, when a user of the ventilating system operates switch 11 to turn on the commercial power supply and to set a low notch as a fan notch, main body 3 of the ventilating system is powered on, and a power supply voltage is applied to control circuit 10. As shown in FIG. 5, when the low notch is set, 100 m³/h is selected as an air flow rate. When the fan notch is set, control unit 16 gives the activation compensation VSP 3 seconds after the power supply voltage is applied to operate DC motor 8. When the activation compensation VSP is applied to DC motor 8, current detecting unit 18*c* that detects a current flowing in control drive IC 8*a* detects the current. A detected value detected by current detecting unit 18*c* is input to control unit 16.

When a plurality of detected values (for example, when three low-resistance resistors are connected in series with each other as shown in FIG. 7, a first current detected value, a second current detected value, and a third current detected value) detected by current detecting unit 18 that detects a current of DC motor 8, control unit 16 selects an optimum detected value from the plurality of detected values. Based on a difference between the selected detected value and the detected value of current detecting unit 18*c*, a current flowing in the three-phase winding is calculated.

The value input to control unit 16 and the table data set in control unit 16 in advance are compared with each other to calculate a rotating speed of the rotor of DC motor 8. A comparing method and control performed thereafter are the same as those in Embodiment 1.

A reference used when an optimum detected value is selected from the plurality of current detected values is, for example, as follows. When control unit 16 is applied with a power supply voltage of +5 V and has a resolving power of 10 bits, a value having the highest resolving power is selected from the plurality of detected values detected by current detecting unit 18.

For example, when a current of 50 mA flows in DC motor 8, a total sum of the low-resistance resistors is 4.5Ω, and voltages generated in the low-resistance resistors with respect to the ground of switching power supply circuit 15 are 0.225 V, 0.15 V, and 0.075 V. In this case, when an amplification capability of amplifier 21 is, for example, 10 times, the values input to control unit 16 are 2.25 V, 1.5 V, and 0.75 V, respectively. At this time, since the resolving power can be maximized at 2.25 V with respect to a full-scale value of 5 V, 2.25 V is selected as the detected value of current detecting unit 18.

When the current flowing in DC motor 8 changes from 50 mA to 100 mA by the influence or the like of external wind, according to the same calculating method as described above, values input to control unit 16 are 3.5 V, 3.0 V, and 1.5 V, respectively. In this case, 3.5 V at which the resolving power can be originally maximized with respect 5 V is selected as the detected value. However, in this case, a power supply voltage of +5 V is applied to the amplifier, the value may be higher than a tolerance level of an input value with reference to the characteristics of the amplifier. For this reason, an accurate value may not output from the amplifier. In this case, a voltage of 3.0 V having the next highest resolving power is consequently selected as a detected value of current detecting unit 18.

The ventilating system configured as described above can accurately detect a current flowing in the three-phase winding of DC motor 8. For this reason, even though the duct resistance changes due to the influence of external wind or the like, a ventilation air flow rate can be kept constant.

In current detecting unit 18, since a plurality of current values are detected without switching a switching unit and the like, a change in ground occurring in a switching operation can be eliminated, and noise or the like generated by the change in ground can be eliminated.

In the configuration of the present embodiment, a current flowing in the winding is calculated by subtracting a current (drive current) detected by current detecting unit 18*c* from a current detected by current detecting unit 18 and flowing in DC motor 8. A temperature detecting unit may be arranged near DC motor 8 to detect a temperature of DC motor 8, a drive current of DC motor 8 may be calculated from the detected value, and the drive current may be subtracted from the detected value of current detecting unit 18 to detect a current flowing in the winding. Even though the winding current is directly detected by a current sensor or the like, the same effect as described above can be obtained.

Embodiment 3

In Embodiments 1 and 2, the embodiment in which a current is accurately detected to keep a ventilation air flow rate constant is described.

In Embodiment 3, an embodiment in which, in order to accurately keep a ventilation air flow rate constant, an energization history of the ventilating system is recognized to suppress an influence caused by turning on/off a power supply will be described below with reference to FIG. 9 and FIG. 10. A description of the same constituent elements as those in Embodiment 1 will be omitted.

Figure 9:
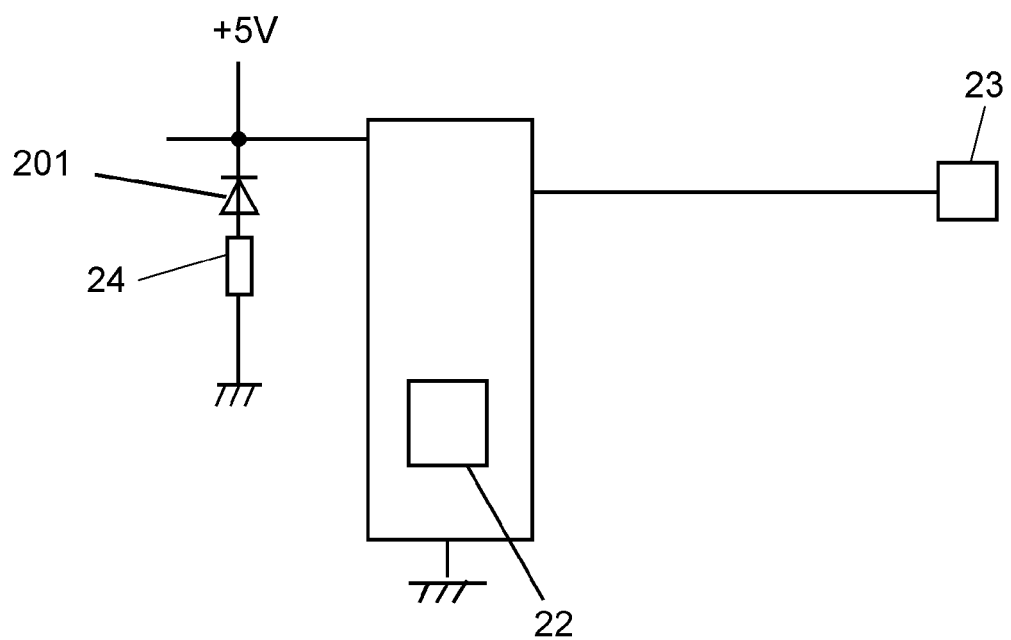
FIG. 9 is a block diagram showing a configuration of a control circuit in Embodiment 3 of the present invention.
Figure 10:
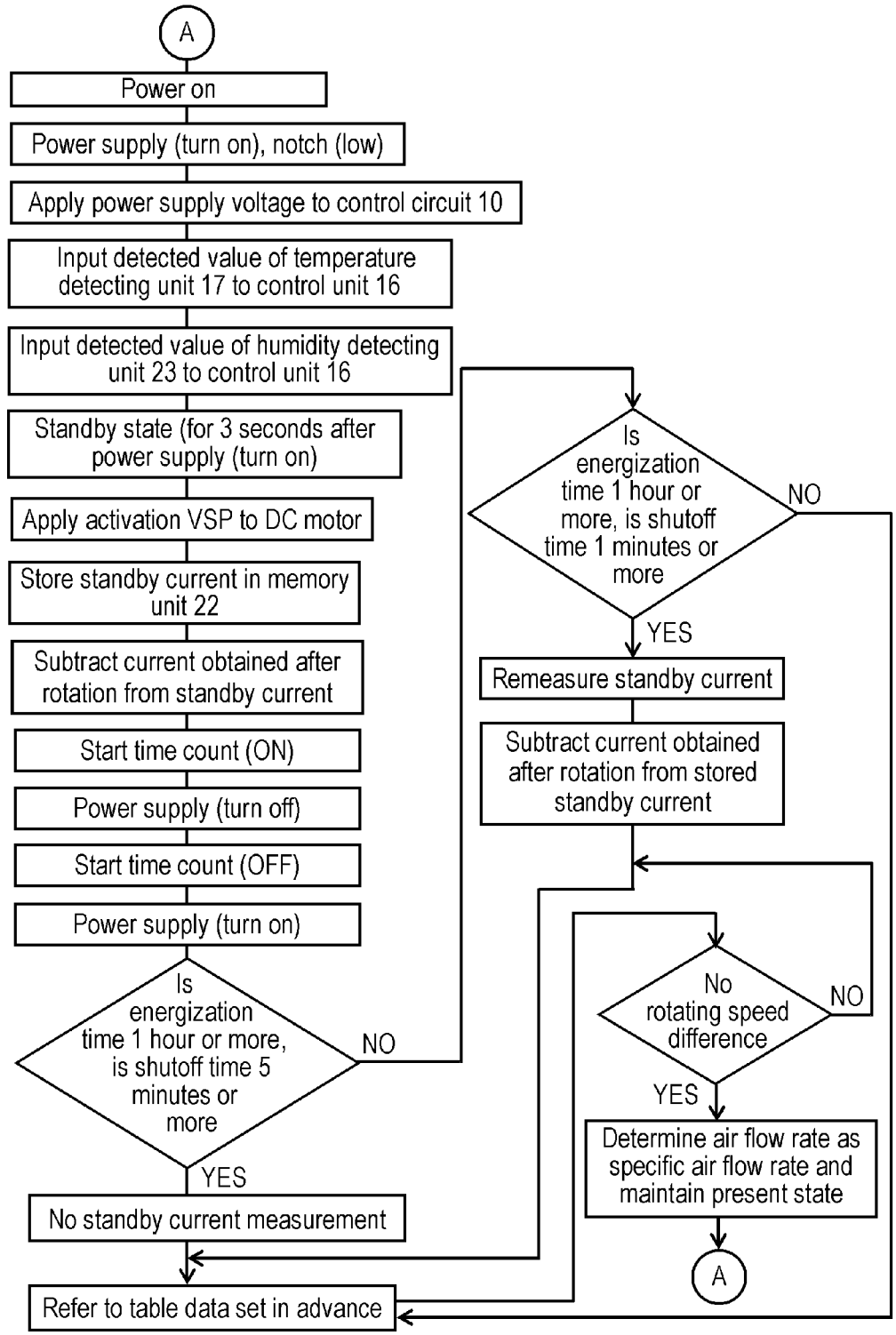
FIG. 10 is a flow chart showing a driving operation of a ventilating system according to Embodiment 3 of the present invention.

The ventilating system according to the present embodiment, as shown in FIG. 9, control circuit 10 includes memory unit 22 (not shown) that stores power-on/off of the power supply, humidity detecting unit 23 that detects humidity, secondary battery 24, and diode 201 that are arranged therein. In control circuit 10, in a turn-off state of the power supply, a cathode side of diode 201 is connected to the power supply (+5 V side) of control circuit 10, and a positive side of secondary battery 24 (for example, a button battery) is connected to an anode side of diode 201. A negative side of secondary battery 24 is connected to the ground.

In order to check a turning-on/off state of commercial power supply 12, control circuit 10 includes a zero-cross circuit (not shown). The zero-cross circuit is a circuit that detects passage of an AC voltage through a zero point.

In the above configuration, an operation of the ventilating system will be described below with reference to the flow chart shown in FIG. 10.

For example, when a user of the ventilating system operates switch 11 to turn on the commercial power supply and to set a low notch as a fan notch, main body 3 of the ventilating system is powered on, and a power supply voltage is applied to control unit 16. When the power supply voltage is applied, a zero-cross voltage is input to control unit 16, and control unit 16 recognizes that the power supply voltage is input. Humidity detecting unit 23 starts detection of humidity and inputs the resultant value to control unit 16. When a detection result of humidity is input to control unit 16, control is started with reference to the table data (not shown) set in advance.

As a current of DC motor 8 in the table data, a value obtained when DC motor 8 is stable is stored. Since control is performed to give the activation compensation VSP to DC motor 8 three seconds after the power supply voltage is applied, DC motor 8 is set in a standby state for 3 seconds after the power supply voltage is applied. A current in the standby state is detected by current detecting unit 18 and stored in memory unit 22. Rotation of DC motor 8 is started 3 seconds after the power supply voltage is applied, and a current including the standby current is detected by current detecting unit 18. For this reason, a difference is subtracted from the standby current stored in memory unit 22 to calculate a winding current. Control unit 16 counts time from a point of time at which DC motor 8 rotates and counts time until the power supply is turned off to shut off the power supply to DC motor 8.

Thereafter, when the user of the ventilating system operates switch 11 to turn off the commercial power supply, a zero-cross voltage is not input to control unit 16. For this reason, a power supply voltage is supplied from secondary battery 24 to control unit 16, and counting of a time for which the power supply is in an off state (OFF), i.e., a shutoff time of DC motor 8 is started.

Thereafter, when switch 11 is operated again to turn on the commercial power supply, control unit 16 makes the following determination.

When the shutoff time of DC motor 8 has passed 5 minutes or more after an energization time of DC motor 8 has passed 1 hour or more, control unit 16 determines that there is no influence by an increase in temperature of DC motor 8 and keeps this state without detecting a current in the standby state.

On the other hand, when the shutoff time of DC motor 8 is extremely short (for example, less than 5 minutes) after the time of energization to DC motor 8 has passed 1 hour or more, control unit 16 determines that there is an influence of an increase in temperature of DC motor 8 and measures a standby current again to calculate a winding current of DC motor 8. At this time, it is further determined whether or not the shutoff time of DC motor 8 is less than 1 minute. Only when the shutoff time is less than 1 minute, the standby current may be measured again.

Since the ventilating system configured as described above can further detect humidity, thereby detecting gravity of air, an influence with respect to humidity can be eliminated. Even though a change in standby current by an increase in temperature of DC motor 8 is not specially corrected by a thermistor, a current flowing in the winding of DC motor 8 can be accurately detected. For this reason, even though a duct resistance changes due to the influence of external wind or the like, a ventilation air flow rate can be kept constant.

Embodiment 4

Embodiment 4 will be described below with reference to FIGS. 11 and 12. A description of the same constituent elements as those in Embodiment 1 will be omitted.

Figure 11:
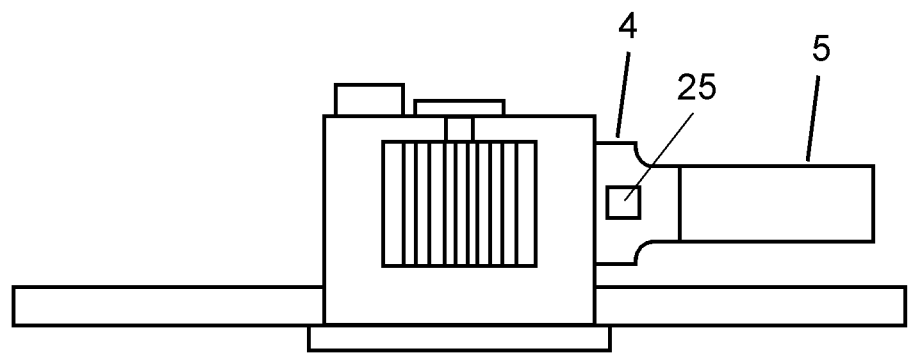
FIG. 11 is an attaching state diagram of a ventilating system according to Embodiment 4 of the present invention.
Figure 12:
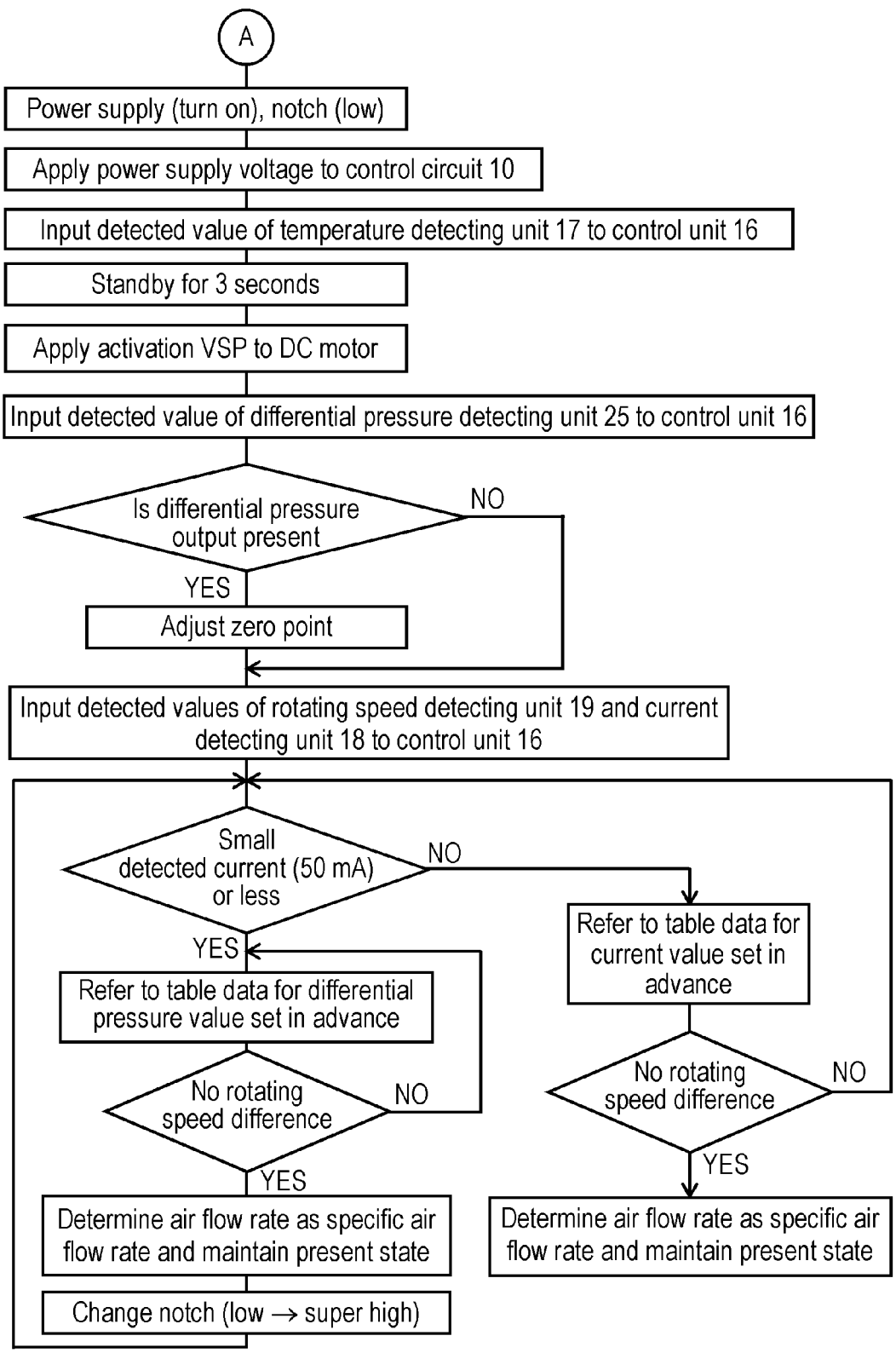
FIG. 12 is a flow chart showing a driving operation of the ventilating system according to Embodiment 4 of the present invention.

As shown in FIG. 11, a ventilating system according to the present embodiment further includes an orifice (not shown) to generate a differential pressure difference in exhaust air duct 5. Installed differential pressure detecting unit 25 is installed on a side surface of exhaust air duct 5. A HIGH-side pressure inlet port (not shown) of differential pressure detecting unit 25 is installed on the front side of the orifice of exhaust air duct 5, and a LOW-side pressure inlet port (not shown) is arranged on the back of the orifice of exhaust air duct 5. Differential pressure detecting unit 25 is connected to control circuit 10 installed in main body 3 by a signal line (not shown).

As the configuration of differential pressure detecting unit 25, a differential pressure sensor (50 Pa) is used to accurately detect a low ventilation air flow rate. The differential pressure sensor has a symmetrical structure having a silicon diaphragm as a pressure-receiving surface. When a pressure is received, the diaphragm varies, and an electric capacitance changes. For this reason, a change of the electric capacitance is electrically output.

In the above configuration, an operation of the ventilating system will be described below with reference to the flow chart shown in FIG. 12.

As described in Embodiment 1, the ventilating system, especially, a ventilating system using a DC motor is configured to make a ventilation air flow rate variable in a multi stage. When the ventilation air flow rate is made variable, a current flowing in the DC motor is automatically made variable.

For example, when it is considered that a current of 30 mA flows by using current detecting unit 18 as described in Embodiment 2, even though a value having an optimum resolving power is selected as a voltage input to control unit 16 by amplifying a current detected by current detecting unit 18, the voltage is 1.35 V at most. For this reason, it is difficult to control an air flow rate at 1.35 V. Therefore, in the present embodiment, a configuration that includes differential pressure detecting unit 25 to detect a current value obtained by current detecting unit 18 is also used.

For example, when a user of the ventilating system operates switch 11 to turn on the commercial power supply and to set a low notch as a fan notch, main body 3 of the ventilating system is powered on, and a power supply voltage is applied to control unit 16. Control unit 16 detects a value of differential pressure detecting unit 25 for 3 seconds in a standby state after the power supply is turned on. When a value of differential pressure detecting unit 25 is output even though DC motor 8 does not rotate, this state is influenced by an attaching state of differential pressure detecting unit 25. For this reason, an output voltage of differential pressure detecting unit 25 is voltage-corrected (zero-point adjustment is performed) by a differential pressure adjusting unit (not shown) included in control unit 16.

In the differential pressure sensor of a silicon diaphragm type, the diaphragm is weighted depending on the attaching state and outputs a signal as a differential pressure signal. For this reason, output adjustment needs to be performed.

DC motor 8 begins to rotate 3 seconds after the power supply voltage is applied, and current detecting unit 18 detects a current flowing in DC motor 8 and inputs the current to control unit 16. When a current flowing in DC motor 8 is small (for example, 30 mA or less), an operation of DC motor 8 is started by using the value of differential pressure detecting unit 25 with reference to a differential pressure data table set in advance.

When the current flowing in DC motor 8 is larger than a predetermined current (for example, 30 mA or more) by the influence of external wind or a change of the notch from low to super high by switch 11, the data table is changed into a current data table set in advance to continue the operation of DC motor 8.

When a ventilation air flow rate is low, even though a current is too small to easily detect the current, the ventilating system configured as described above detects a differential pressure by the differential pressure detecting unit. For this reason, the ventilating system can accurately detect even a low ventilation air flow rate.

Although a low ventilation air flow rate can be detected by differential pressure detecting unit 25, when a high ventilation air flow rate is detected, the range of the differential pressure is scaled out, and the differential pressure may not be able to be detected. However, when an air flow rate is high, a large current flows. For this reason, a value detected by current detecting unit 18 can be used. When objects to be detected are selected at a low air flow rate and a high air flow rate, even though a duct resistance changes by the influence of external wind or the like or the notch is changed by a user of the ventilating system, a ventilation air flow rate can be kept constant.

Embodiment 5

Embodiment 5 will be described below with reference to FIGS. 13 to 17. A description of the same constituent elements as those in Embodiment 1 will be omitted.

Figure 17:
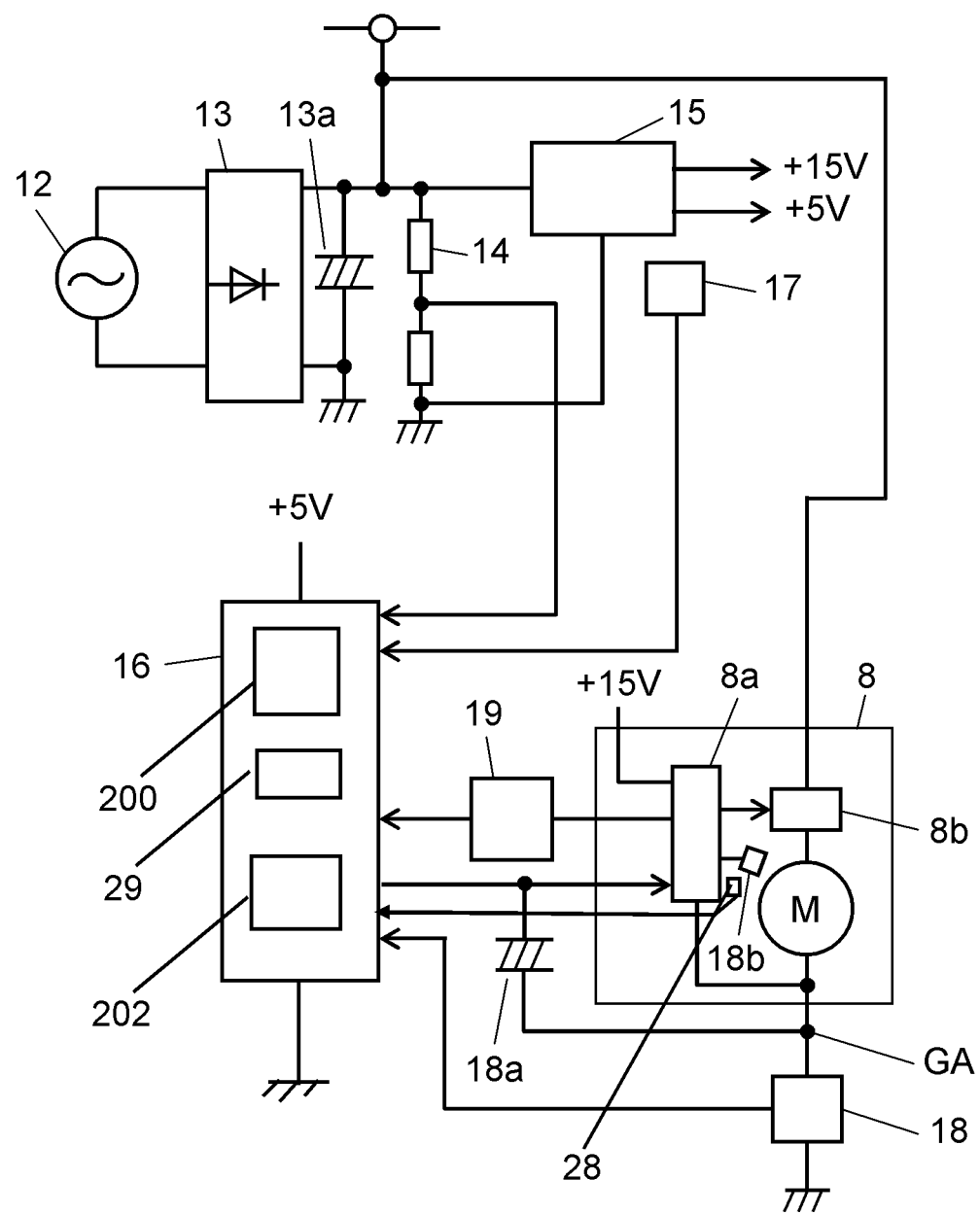
FIG. 17 is a block diagram showing a configuration of a control circuit in Embodiment 5 of the present invention.

In Embodiment 1, near switching power supply circuit 15, temperature detecting unit 17 that measures a temperature of switching power supply circuit 15 is arranged. However, in the present embodiment, as shown in FIG. 17, in place of temperature detecting unit 17, temperature detecting unit 28 that detects a temperature of a hall element is arranged in DC motor 8.

A relationship between an input resistance (resistance between input terminals in an open-output-terminal state without magnetic field) and a temperature of the hall element has characteristics in which a resistance is high in a low-temperature state and quadratically decreases when a temperature decreases. (For example, at −40° C.: 1800 $\Omega$, 25° C.: 240$\Omega$, and 50° C.: 100$\Omega$).

Control unit 16 is configured such that memory unit 29 that stores a value at which a fluctuation of electronic parts is corrected is included in a nonvolatile memory device or the like.

As the nonvolatile memory device, for example, an EEPROM is used. An EEPROM is a semiconductor memory device that can erase or rewrite data by operating a voltage.

The fluctuation of the electronic parts may cause a decrease in motor current detecting accuracy. For this reason, in order to improve the motor current detecting accuracy, the resistor constituting current detecting unit 18 that detects currents flowing in a microcomputer power supply and DC motor 8 that influence the motor current detecting accuracy is corrected.

Figure 13:
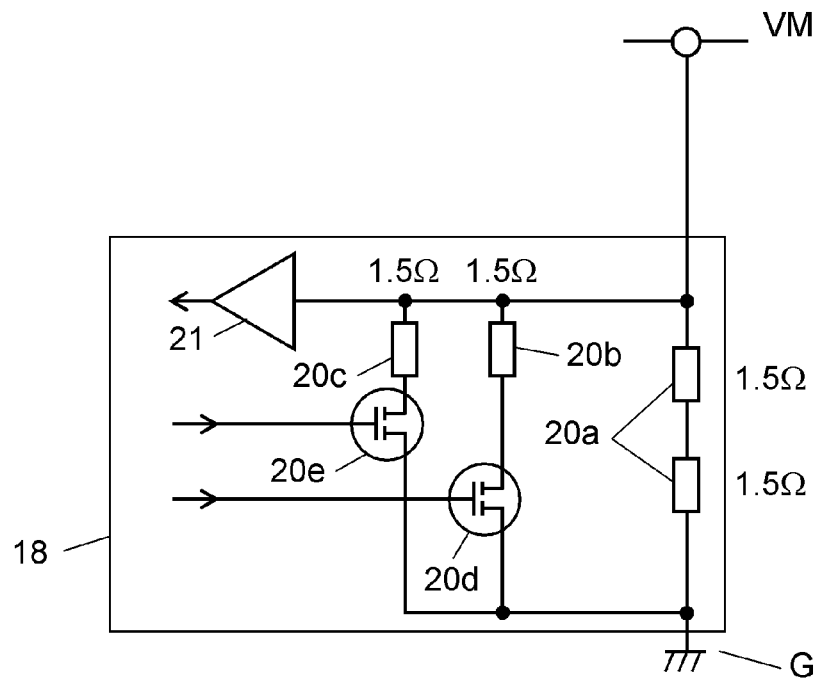
FIG. 13 is a block diagram of a current detecting unit of the ventilating system in Embodiment 5 of the present invention.

The correction is performed as follows. As shown in FIG. 13, for example, a current of 100 mA is caused to flow between VM and G, and first switching unit 20*d* and second switching unit 20*e* are turned off. In this manner, a fluctuation of a resistance of low-resistance resistors 20*a* included as one of the resistors of current detecting unit 18 is corrected. First switching unit 20*d* is turned on, and, similarly, the resistance of first resistor 20*b* is corrected. Finally, second switching unit 20*e* is turned on to correct a resistance of second resistor 20*c*. These correction results are sequentially stored in memory unit 29. For example, a current value converting method obtained when low-resistance resistor 20*a* is used will be described below. As shown in FIG. 17, control unit 16 further includes current value calculating unit 202. Current value calculating unit 202 compares a value stored in memory unit 29 with a theoretical value calculated by a calculation to determine an equivalent. (For example, although a theoretical value of the resistance of low-resistance resistors 20*a* should be 3.0 $\Omega$×100 mA=0.3 V, a value stored in memory unit 29 is (2.8 $\Omega$×100 mA=) 0.28V.) More specifically, with reference to the data table with a value obtained by multiplying a voltage corresponding to an actually measured current value by 0.3/0.28=1.07, a rotating speed corresponding to the current is obtained. When first resistor 20*b* or second resistor 20*c* is connected, a current value is converted by the same method as described above.

Figure 14:
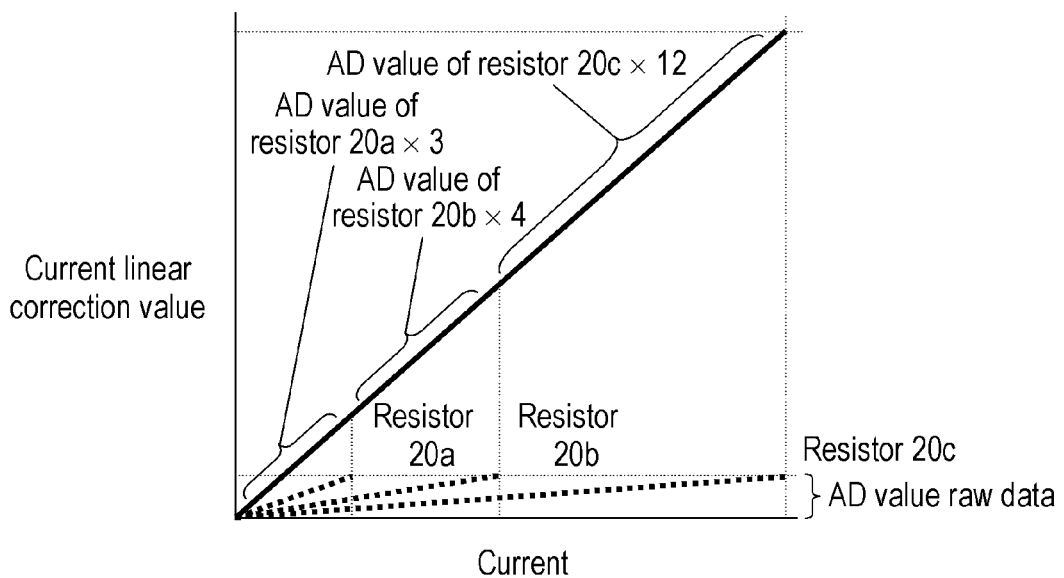
FIG. 14 is a graph showing a relationship between a current linear correction value and a current in the ventilating system according to Embodiment 5 of the present invention.

Current detecting unit 18, as described in Embodiment 1, when a current of DC motor 8 is to be detected, the current is detected while switching first switching unit 20*d* and second switching unit 20*e*. In this configuration, a detected value of a current input to control unit 16, as shown in FIG. 14, depending on opening/closing states of first switching unit 20*d* and second switching unit 20*e*, a relationship between an AD value (value obtained after analog-digital conversion) read by a microcomputer and a current (AD value-current) flowing in a current detecting resistor changes in three steps. Therefore, results obtained in states set when the low-resistance resistors serving as first switching unit 20*d* and second switching unit 20*e* are switched become discontinuous. For this reason, appropriate control cannot be performed. More specifically, one AD value includes three current values, and the current values are uncontrollable. Therefore, in the present embodiment, current value calculating unit 202 included in control unit 16 multiplies raw data of the AD value by a predetermined magnification. For example, the AD value is multiplied by 3 when a voltage value of only low-resistance resistors 20*a* is read, the AD value is multiplied by 4 when voltage values of low-resistance resistors 20*a* and first resistor 20*b* are read, and the AD value is multiplied by 12 when voltage values of low-resistance resistors 20*a*, first resistor 20*b*, and second resistor 20*c* are read to convert the discontinuous current detected values into continuous values, respectively. In this manner, one-to-one correspondence between the current value and the AD value can be made possible.

The conversion formula will be described below. That is, equivalent=(raw AD value)×(magnification coefficient k/microcomputer AD value resolving power(1024))×(theoretical value (calculation result)/resistance adjusted AD value) is established.

Figure 15:
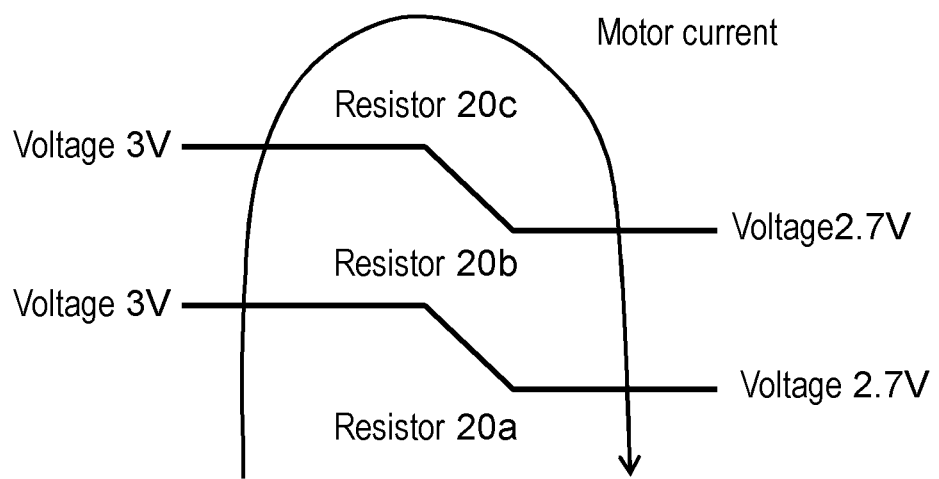
FIG. 15 is a block diagram showing a configuration in which a differential is set in a current threshold value of the ventilating system according to Embodiment 5 of the present invention.

In the present embodiment, in order to switch a plurality of low-resistance resistors having different resistances, as shown in FIG. 15, current threshold values are made differential.

Control unit 16 outputs control signal VSP to DC motor 8 based on the current value detected by current detecting unit 18 while checking a reply of a rotating speed from DC motor 8. DC motor 8 is to make an applied voltage variable depending on the value of control signal VSP. However, when there is no reply of a rotating speed even though control signal VSP is output, it is determined that some abnormality occurs in DC motor 8, and all the switching units are stopped.

Figure 16:
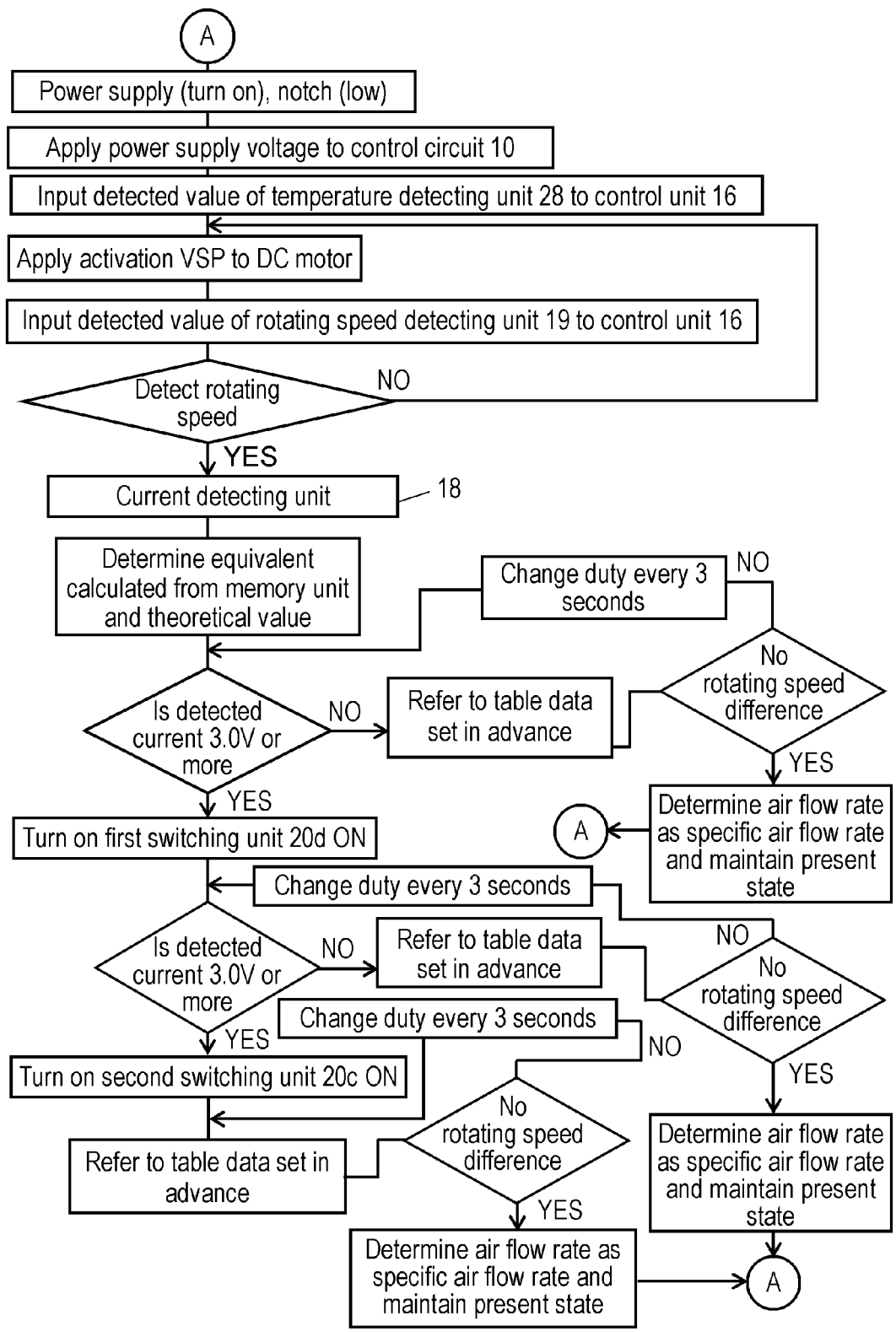
FIG. 16 is a flow chart showing a driving operation of the ventilating system according to Embodiment 5 of the present invention.

In the above configuration, an operation of the ventilating system will be described below with reference to the flow chart shown in FIG. 16.

A description of the same operation as that in Embodiment 1 will be omitted.

A temperature detected by temperature detecting unit 28 that detects a temperature of the hall element is input to control unit 16. A current flowing in the winding of DC motor 8 is calculated by subtracting a current flowing in the hall element from a current detected by current detecting unit 18 of DC motor 8. The current flowing in the hall element is converted from the detected value of temperature detecting unit 28. Since a current flowing in the winding of DC motor 8 changes depending on an atmospheric temperature, a current flowing in the hall element is calculated from the temperature detected by temperature detecting unit 28, and temperature correction is performed by a hall element temperature correcting unit (not shown) included in control unit 16.

When control signal VSP is input to DC motor 8 as an activation compensation value, a current flows in the winding of DC motor 8 to rotate DC motor 8. At this time, a current detected by current detecting unit 18 and a rotating speed detected by rotating speed detecting unit 19 are input to control unit 16.

At this time, when information of the rotating speed is not input to control unit 16, control unit 16 determines the presence of abnormality to turn off all the switching means.

When the information of the rotating speed is input to control unit 16, current value calculating unit 202 corrects a value actually detected by current detecting unit 18 by the above method based on the value stored in memory unit 29 and a theoretical value to calculate an equivalent.

When the equivalent obtained by the value detected by current detecting unit 18 does not reach, for example, 3.0 V, first switching unit 20d and second switching unit 20e are kept in that state. Control unit 16 refers to a rotating speed corresponding to the equivalent from the value detected by current detecting unit 18 in the data table and compares the rotating speed with an actual rotating speed detected by rotating speed detecting unit 19. As a result of comparison, when control unit 16 determines that the rotating speed is high, control unit 16 boosts the duty cycle every 3 seconds. When this operation is repeated to eliminate a difference between the rotating speeds, control unit 16 determines that a ventilation air flow rate is specific to cancel the variable state of the duty cycle.

For example, a duct resistance increases due to the influence of external wind or the like, the rotating speed decreases to increase a current. As a result, when the equivalent obtained by the value detected by current detecting unit 18 is 3.0 V or more, first switching unit 20d is turned on. In this manner, first resistor 20b is connected to low-resistance resistors 20a in parallel with each other. More specifically, the resistance of current detecting unit 18 is 1Ω. When the equivalent does not reach 3.0 V when first switching unit 20d is turned on, this state is maintained. As in the above description, the detected value of current detecting unit 18 input to control unit 16 and the data table stored in control unit 16 in advance are compared with each other. When the rotating speed of the rotor of DC motor 8 is higher or lower than the specific rotating speed, the duty cycle is changed every 3 seconds. When the difference between the rotating speed and the specific rotating speed is eliminated by repeating the above operation, control unit 16 determines that the specific ventilation air flow rate is obtained to cancel the variable state of the duty cycle.

On the other hand, when the value detected by current detecting unit 18 exceeds 3.0 V when first switching unit 20d is turned on, second switching unit 20e is further turned on. As in the above description, an equivalent obtained by the detected value of current detecting unit 18 input to control unit 16 is compared with the data table stored in control unit 16 in advance. When the rotating speed of the rotor of DC motor 8 is higher or lower than the specific rotating speed, the duty cycle is changed every 3 seconds. When the difference between the rotating speed and the specific rotating speed is eliminated by repeating the above operation, control unit 16 determines that the specific ventilation air flow rate is obtained to cancel the variable state of the duty cycle.

As described above, the ventilation air flow rate is adjusted by boosting or lowering the duty cycle every three seconds.

When second switching unit 20e is in an ON state, if a static pressure drops due to the absence of the influence of external wind or the like, there is no duct resistance. For this reason, a current flowing in DC motor 8 decreases. Therefore, when an equivalent obtained by a value detected due to a decrease in current by current detecting unit 18 is 2.7 V, i.e., at a differential current threshold value of 0.3 V with respect to 3.0 V, second switching unit 20e is turned off. When the detected value is 3.0 V or more even though second switching unit 20e is turned off, first switching unit 20d is turned off.

As described above, the ventilation air flow rate is adjusted by boosting or lowering the duty cycle every 3 seconds. Control unit 16 includes a designation voltage varying unit that corrects a voltage value of control signal VSP. As described above, when first switching unit 20d or second switching unit 20e is switched to connect first resistor 20b or second resistor 20c, the designation voltage varying unit corrects the voltage value of control signal VSP in accordance with a switching state to give the corrected value to DC motor 8.

The ventilating system configured as described above sequentially switches resistance by using first switching unit 20d and second switching unit 20e while detecting a current flowing in DC motor 8 and secures a necessary resolving power by always selecting an optimum resistance for the current to perform current detection. For this reason, since a current can be accurately detected, even though a duct resistance changes due to the influence of external wind or the like, a ventilation air flow rate can be kept constant.

INDUSTRIAL APPLICABILITY

A ventilating system according to the present invention fitted on a building is popularly useful in a product that can obtain an air flow rate within a predetermined period of time regardless of a duct resistance and an external wind pressure.

REFERENCE MARKS IN THE DRAWINGS 1 room interior
2 Attic
3 Main body
4 Adapter
5 Exhaust air duct
6 Exhaust port
7 Blades 8 DC motor
8a Control drive IC
8b Drive circuit
9 Louver
10 Control circuit
11 Switch
12 Commercial power supply
13 Rectifying circuit
14 Voltage detecting unit
15 Switching power supply circuit
16 Control unit
17 Temperature detecting unit
18 Current detecting unit
18c Current detecting unit
19 Rotating speed detecting unit
20a Low-resistance resistor
20b First resistor
20c Second resistor
20d First switching unit
20e Second switching unit
21 Amplifier
22 Memory unit
23 Humidity detecting unit
24 Secondary battery
25 Differential pressure detecting unit
28 Temperature detecting unit
29 Memory unit
200 Designation voltage varying unit
201 Diode
202 Current value calculating unit

The invention claimed is:

1. A ventilating system that can make an air flow rate variable, comprising:
a DC motor that drives blades in a main body; and
a control drive IC that is built in the DC motor and controls the DC motor, wherein
a control circuit in the main body includes a first current detecting unit that detects a current flowing in the DC motor, a second current detecting unit that detects a motor drive current that flows in the control drive IC and drives the DC motor, a rotating speed detecting unit that detects a rotating speed of the DC motor, and a control unit that controls the DC motor based on the rotating speed detected by the rotating speed detecting unit, the current detected by the first current detecting unit and the current detected by the second current detecting unit, and
the first current detecting unit includes a plurality of low-resistance resistors and detects the current flowing in the DC motor by switching the low-resistance resistors, and calculates a ventilation air flow rate from the rotating speed detected by the rotating speed detecting unit and a current value calculated by subtracting the current detected by the second current detecting unit from the current detected by the first current detecting unit.

2. The ventilating system according to claim 1, comprising:
a low-resistance resistor switching unit that switches connection/disconnection of the plurality of low-resistance resistors, wherein
the control unit switches the low-resistance resistor switching unit based on the current detected by the first current detecting unit.

3. The ventilating system according to claim 2, comprising:
a current value calculating unit that converts current detected values of the first current detecting unit that are discontinuous by switching the resistance of the first current detecting unit by the low-resistance resistor switching unit into continuous values based on a ratio of the resistances.

4. The ventilating system according to claim 3, comprising:
a memory unit that stores a voltage value generated across both ends of the low-resistance resistor in a state in which a specific current value flows in the low-resistance resistor in a nonvolatile memory device as a memory value in association with the specific current value; and
a current value calculating unit that compares a voltage value generated across both the ends of the low-resistance resistor in an operation state of the DC motor with the memory value stored in the memory unit to calculate the current value.

5. The ventilating system according to claim 2, wherein
the low-resistance resistor switching unit makes current threshold values to switch resistances of the first current detecting unit differential.

6. The ventilating system according to claim 2, comprising:
a designation voltage varying unit that varies a motor designation voltage to the DC motor when the resistances of the first current detecting unit are switched by the low-resistance resistor switching unit.

7. The ventilating system according to claim 2, wherein
all the switching units of the low-resistance resistor switching unit are turned off in a motor-lock state.

8. The ventilating system according to claim 1, comprising:
an amplifier that amplifies a ground potential of the DC motor; and
a gain changing unit that changes a gain of the amplifier, wherein
the control unit switches the gain changing unit based on the current detected by the first current detecting unit.

9. The ventilating system according to claim 1, comprising
a voltage detecting unit that detects a voltage applied to a motor, wherein
the ventilation air flow rate is calculated based on the rotating speed, the current, and the voltage.

10. The ventilating system according to claim 9, comprising
a current detecting unit that detects a current flowing in a winding of the DC motor.

11. The ventilating system according to claim 1, comprising
a differential pressure detecting unit, wherein
the ventilation air flow rate is determined based on a detected value of the differential pressure detecting unit when the current value detected by the first current detecting unit is a predetermined value or less.

12. The ventilating system according to claim 11, comprising
a differential pressure adjusting unit that voltage-corrects an output voltage obtained depending on an attaching state of the differential pressure detecting unit.

13. The ventilating system according to claim 1, wherein
a temperature detecting unit is arranged in the control circuit.

14. The ventilating system according to claim 1, wherein
a temperature detecting unit is arranged in the DC motor.

15. The ventilating system according to claim 14, comprising
a hall element temperature correcting unit that corrects temperature characteristics of a hall element that measures a temperature in the DC motor and corrects temperature characteristics of the hall element built in the motor.

16. The ventilating system according to claim 1, comprising
   a humidity measuring unit that measures an ambient humidity of the ventilating system.

17. The ventilating system according to claim 1, wherein a memory unit that stores a turning-on/off state of a power supply and a secondary battery that supplies a power to the control circuit when the power supply is turned off are arranged in the control circuit, and the control unit always monitors the turning-on/off state of the power supply.

* * * * *